United States Patent Office 3,496,200
Patented Feb. 17, 1970

3,496,200
8α-GONA-1,3,5(10),9(11)-TETRAEN-17β-OLS AND THE RELATED FORMATES THEREOF
Reinhardt P. Stein, Conshohocken, George C. Buzby, Jr., Philadelphia, and Herchel Smith, Wayne, Pa., assignors to American Home Products Corporation, New York, N.Y., a corporation of Delaware
No Drawing. Filed June 22, 1967, Ser. No. 647,928
Int. Cl. C07c 169/08, 167/14; A61k 17/00
U.S. Cl. 260—397.5          10 Claims

ABSTRACT OF THE DISCLOSURE

This invention is concerned with 8α-gona-1,3,5(10),9(11)-tetraen-17β-ols and their corresponding formates which are pharmacologically useful as anti-lipemic agents. Further, some of the steroid compounds of this invention are also useful as intermediates in the preparation of hormonally active 8α-gona,1,3,5(10)-trien-17β-ols.

---

This invention relates to new and useful 8α-gona-tetraenols and their related formates. In particular, the present invention is concerned with 8α-gona-1,3,5(10),9(11)-tetraen-17β-ols and their corresponding formates which are pharmacodynamically active as anti-lipemic agents. Further, some of these compounds are useful as intermediates in the preparation of 8α-gona-1,3,5(10)-trien-17β-ols.

The new and novel compounds which are included within the purview of the present invention are represented by the following formula:

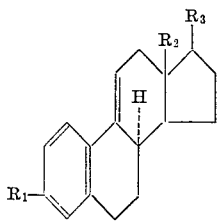

wherein $R_1$ is selected from the group consisting of hydroxy, tetrahydropyranyloxy, lower alkoxy, cyclo(lower)alkoxy and acyloxy e.g. lower alkanoyloxy; $R_2$ is lower alkyl and $R_3$ is selected from the group consisting of hydroxy and formyloxy, with the proviso that when $R_3$ is hydroxy $R_1$ is other than lower alkanoyloxy. As employed herein the terms lower alkoxy, lower alkanoyloxy and lower alkyl are meant to include substituents having from one to about seven carbon atoms, while the term cyclo(lower)alkoxy is meant to include those cyclic substituents having from three to about seven carbon atoms. Typical examples thereof are: dl-13-methyl-3-methoxy-8α-gona-1,3,5(10),9(11)-tetraen-17β-ol, formate; dl-13-methyl-3-methoxy-8α-gona-1,3,5(10),9(11)-tetraen-17β-ol; dl-13-ethyl-3-cyclopentoxy-8α-gona-1,3,5(10),9(11)-tetraen-17β-ol and dl-3-acetoxy-13-ethyl-8α-gona-1,3,5(10),9(11)-tetraen-17β-ol, formate.

The new and novel compounds of the present invention are prepared by the procedure which is schematically depicted as follows:

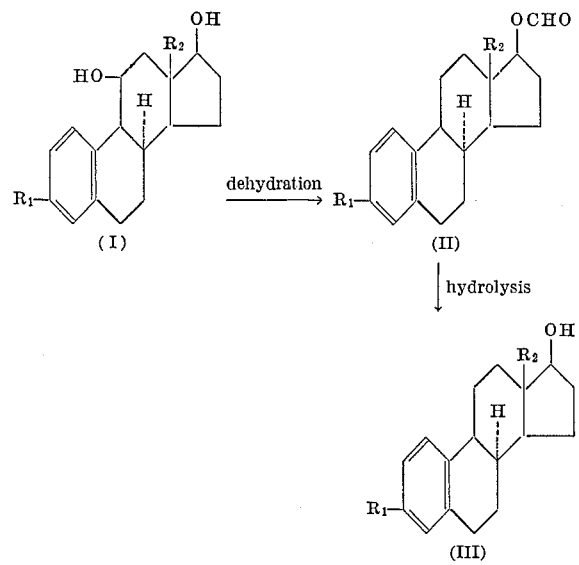

wherein $R_1$ and $R_2$ are defined as above. The dehydration reaction is effected by reacting an 8α-gona-1,3,5(10)-trien-11,17β-diol (I) in dimethyl formamide and pyridine with methane sulfonyl chloride, under an inert atmosphere e.g. under nitrogen or argon at a temperature range from about 60° C. to about reflux temperatures for a period of about one-quarter of an hour to about four hours. Preferably this reaction is conducted under argon at about 90° C. for a period of about one hour.

When the dehydration reaction is complete, the reaction mixture is cooled and the 8α-gona-1,3,5(10),9(11)-tetraen-17β-ol, formate (II) separated by conventional recovery procedures, for example, the reaction mixture may be poured into water, extracted with a water-immiscible solvent e.g. ether, benzene, toluene and the like, washed, dried, filtered and evaporated to afford the desired product (II) which may then be further purified by column chromatography.

The hydrolysis reaction is effected by contacting an above prepared 8α-gona-1,3,5(10),9(11)-tetraen-17β-ol, formate (II) with an alkali or alkaline earth metal hydroxide or carbonate in a polar solvent e.g. water, an alkanol or aqueous tetrahydrofuran, at a temperature range from about 20° C. to about reflux temperatures for a period from about five minutes to about two hours. Preferably this reaction is conducted by contact with sodium hydroxide in methanol at room temperature for about a half hour.

When the hydrolysis reaction is complete, the product is separated by the dropwise addition of water to the reaction mixture. The appropriate 8α-gona-1,3,5(10),9(11)-tetraen-17β-ol (III) is then obtained by filtration and further purified, if so desired, by standard procedures, such as, dissolution in methylene chloride, treatment with charcoal, filtration, crystallization by solvent replacement and recrystallization from a suitable solvent e.g. an alkanol-alkane mixture. When the aforesaid hydrolysis reaction is conducted on a 3-lower alkanoyloxy-8α-gona-1, 3,5(10),9(11)-tetraen-17β-ol the resulting product is a corresponding 8α - gona-1,3,5(10),9(11)-tetraene-3,17β-diol which compounds have resisted the hereinafter described hydrogenation reactions.

Some of the new and novel 8α-gona-1,3,5(10),9(11)-tetraen-17β-ols (III) of the present invention may be converted to their corresponding 8α-gona-1,3,5(10)-trien-17β-ol (IV) by the hereinafter exemplified reaction scheme:

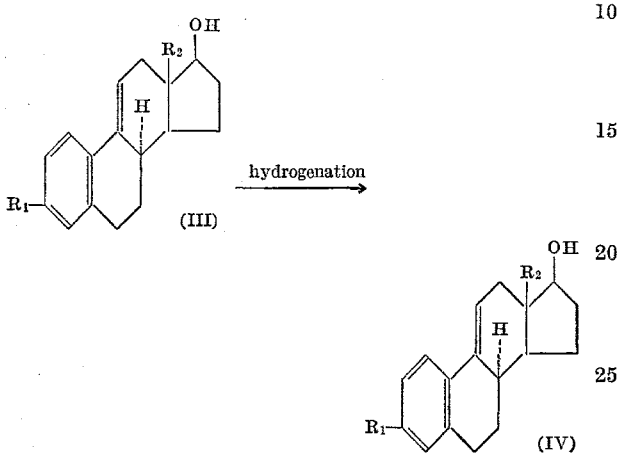

wherein $R_1$ and $R_2$ are defined as above except that $R_1$ is not hydroxy or lower alkanoyloxy. This hydrogenation may be effected by known methods, such as, catalytic hydrogenation e.g. using palladium on carbon as the catalyst, or an alkali metal in liquid ammonia. When the aforesaid catalytic hydrogenation procedure is employed, the 8α-gona-1,3,5(10),9(11)-tetraen-17β-ol (III) is contacted with from about two to ten percent palladium on carbon in a reaction-inert solvent e.g. an alkanol, benzene, toluene and ethyl acetate, under a positive hydrogen atmosphere until hydrogen uptake is complete. Thereafter, the desired 8α-gona-1,3,5(10)-trien-17β-ol (IV) is obtained by conventional methods e.g. filtration, concentration, clarification with charcoal and reconcentration.

Alternatively, when this hydrogenation is conducted using an alkali metal and liquid ammonia, the alkali metal e.g. lithium, sodium and potassium is added with stirring to a solution of a 8α-gona-1,3,5(10),9(11)-tetraen-17β-ol (III), liquid ammonia and a proton-donor e.g. aniline or pyrrol, in a reaction-inert organic solvent e.g. ether, dioxane and tetrahydrofuran. When the hydrogenation reaction is complete, the reaction mixture is quenched e.g. with an alkanol or ammonium chloride, and the desired 8α-gona-1,3,5(10)-trien-17β-ol separated e.g. aqueous dilution, extraction with a water-immiscible solvent, evaporation of the extract and recrystallization of the residue from a suitable solvent, such as, ether-hexane, methanol and isopropanol.

The 8α-gona-1,3,5(10)-trien-11,17β-diols (I) employed as starting materials for the synthesis of the compounds of this invention may be prepared by the procedures described in copending U.S. Patent application Ser. No. 593,059, filed on Nov. 9, 1966, or from compounds whose preparation from the compounds therein described would be obvious to one skilled in the art of organic chemistry. The 8α-gona-1,3,5(10)-trien-17β-ols (IV) which are prepared from the compounds of the present invention and the hormonal activities thereof are described in copending U.S. Patent application Ser. No. 448,417, filed on Apr. 15, 1965, and Ser. No. 461,909, filed on June 7, 1965, now Patent No. 3,407,217.

In accord with the present invention the new and novel 8α - gona - 1,3,5(10),9(11)-tetraen-17β-ol, formates (II) and 8α-gona-1,3,5(10),9(11)-tetraen-17β-ols (III) of the present invention have also been found to possess interesting pharmaceutical properties which render them useful as synthetic medicinals. More particularly, these compounds, in standard pharmacological tests, have exhibited utility as anti-lipemic agents.

When the new and novel compounds of the present invention are employed as anti-lipemic agents, they may be administered alone or in combination with pharmaceutically acceptable carriers, the proportion of which is determined by the solubility and chemical nature of the compound, chosen route of administration and standard pharmaceutical practice. For example, they may be administered orally in the form of tablets or capsules containing such excipients as starch, milk sugar, certain types of clay and so forth. They may be administered orally in the form of suspensions which may contain coloring and flavoring agents or they may be injected parenterally. For parenteral administration they may be used in the form of a sterile suspension containing additional components for example, enough saline or glucose to make the solution isotonic.

The dosage of the present therapeutic agents will vary with the form of administration and the particular compound chosen. Furthermore, it will vary with the particular subject under treatment. Generally, treatment is initiated with small dosages substantially less than the optimum dose of the compound. Thereafter, the dosage is increased by small increments until the optimum effect under the circumstances is reached. It will generally be found that when the composition is administered orally, larger quantities of the active agent will be required to produce the same effect as a smaller quantity given parenterally. In general, the compounds of this invention are most desirably administered at a concentration level that will generally afford effective results without causing any harmful or deleterious side effects and preferably at a level that is in the range of from about 0.1 mg. to about 10 mg. per day, although as aforementioned variations will occur. However, a dosage level that is in the range of from about 0.2 mg. to about 5.0 mg. per day is most desirably employed in order to achieve effective results.

The following examples are given by way of illustration and are not to be construed as limitations of this invention, variations of which are possible without departing from the scope and spirit thereof.

Example I

To a solution of dl-13-methyl-3-methoxy-8α-gona-1,3,5(10)-trien-11,17β-diol (3.44 g.) in dimethyl formamide (40 ml.) and pyridine (10 ml.) there is added methane sulfonyl chloride (5 ml.). The reaction is heated under argon to 85° C., kept at 85–90° C. for forty-five minutes and then cooled to room temperature. The reaction is poured into water, extracted into ether, the extract washed with water and brine, dried over anhydrous sodium sulfate, filtered and evaporated in vacuo to an oil. The oil is dissolved in benzene, passed through a short column of Florex XXS, the benzene removed in vacuo and the resulting oil dissolved in 95 percent ethanol, scratched and allowed to stand to deposit 2.00 g. of the product as slight yellow prisms, M.P. 112–115° C. A sample (300 mg.) is further purified by dissolving in benzene, passing the solution through 10 percent silver nitrate-impregnated alumina, evaporating the eluant in vacuo, charcoaling the residue (Nuchar) in methylene chloride solution, filtering (super cel) and replacing the solvent with absolute ethanol by boiling. The resulting crystalline solid is filtered to give 200 mg. of the pure dl-13-methyl-3-methoxy-8α-gona-1,3,5(10),9(11)-tetraen-17β-ol, formate; M.P. 117–119° C., $$\lambda^{KBr}_{max.} 5.82\mu; \lambda^{EtOH}_{max.} 259 \text{ m}\mu \ (\epsilon \ 18,400)$$

Calcd. for $C_{20}H_{24}O_3$: C, 76.89%; H, 7.74%; Found: C, 77.24%; H, 7.86%.

In a similar manner, dl-13-ethyl-3-methoxy-8α-gona-1,3,5(10)-trien-11,17β-diol is converted to dl-13-ethyl-3-methoxy-8α-gona-1,3,5(10),9(11)-tetraen-17β-ol, formate.

Example II

*dl*-13-methyl-3-methoxy-8α-gona-1,3,5(10),9(11)-tetraen-17β-ol, formate (1.10 g.) prepared in Example I is added as a solid to a solution of sodium hydroxide (400 mg.) in methanol (50 ml.) and the resulting mixture is stirred and warmed briefly to dissolve the solid. The reaction mixture is then stirred at room temperature for a half hour and water is added dropwise to precipitate the crude product. The filtered solid in methylene chloride is treated with charcoal (Nuchar), filtered through super cel and the solvent replaced with isopropanol by boiling. The resulting crystalline solid (0.80 g., M.P. 142–146°) is recrystallized from isopropanol-heptane to give *dl*-13-methyl-3-methoxy-8α-gona-1,3,5(10),9(11)-tetraen-17β-ol (0.65 g. as a partial solvate, M.P. 142–145° C.;

$\lambda_{max}^{KBr}$ 3.02μ; $\lambda_{max}^{EtOH}$ 258 mμ (ε 19,800)

Calcd. for $C_{19}H_{24}O_2 \cdot \frac{1}{4}C_3H_8O$: C, 79.23%; H, 8.75%. Found: C, 78.90%; H, 8.28%.

Similarly, *dl*-13-ethyl-3-methoxy-8α-gona-1,3,5(10),9(11)-tetraen-17β-ol, formate is hydrolyzed to afford *dl*-13-ethyl-3-methoxy-8α-gona-1,3,5(10),9(11)-tetraen-17β-ol.

Example III

A solution of *dl*-13-methyl-3-methoxy-8α-gona-1,3,5(10),9(11)-tetraen-17β-ol (200 mg.) as prepared in Example II in tetrahydrofuran (15 ml.) is added to liquid ammonia (70 ml.) containing tetrahydrofuran (10 ml.) and aniline (2 ml.). Lithium metal (0.02 g.) is added, the solution stirred and then quenched with ethanol (10 ml.). Water is added and the mixture extracted with ether, the extract washed, dried, filtered and evaporated. The residue is crystallized from ether-hexane to give 125 mg. of *dl*-13-methyl-3-methoxy-8α-gona-1,3,5(10)-trien-17β-ol, M.P. 102–104° C.

In like manner, *dl*-13-ethyl-3-methoxy-8α-gona-1,3,5(10),9(11)-tetraen-17β-ol is hydrogenated to yield *dl*-13-ethyl-3-methoxy-8α-gona-1,3,5(10)-trien-17β-ol.

Example IV

To a solution of *dl*-13-ethyl-3-cyclopentoxy-8α-gona-1,3,5(10)-trien-11,17β-diol (3.5 g.) in dimethyl formamide (40 ml.) and pyridine (10 ml.), there is added methane sulfonyl chloride (5 ml.). The reaction is heated under argon to 85° C., kept at 85–90° C. for one hour and then cooled to room temperature. The reaction mixture is poured into water, extracted into ether, the extract washed with water and brine, dried over anhydrous sodium sulfate, filtered and evaporated in vacuo. The residue is dissolved in benzene passed through a short column of Florex XXS, the benzene removed in vacuo and the resulting residue in 95 per cent ethanol scratched and allowed to stand to deposit *dl*-13-ethyl-3-cyclopentoxy-8α-gona-1,3,5(10),9(11)-tetraen-17β-ol, formate.

The above prepared formate (1.0 g.) is added to a solution of sodium hydroxide (400 mg.) in methanol (50 ml.) and the resulting solution stirred and warmed briefly to dissolve the solid. The reaction mixture is then stirred at room temperature for a half hour and then water is added dropwise to precipitate the crude product. The filtered solid in methylene chloride is treated with charcoal (Nuchar), filtered through super cel and the solvent replaced with isopropanol by boiling. The resulting product is recrystallized from isopropanol-heptane to give *dl*-13-ethyl-3-cyclopentoxy-8α-gona-1,3,5(10),9(11)-tetraen-17β-ol.

A solution of the above prepared *dl*-13-ethyl-3-cyclopentoxy-8α-gona-1,3,5(10),9(11)-tetraen-17β-ol (200 mg.) in ether (15 ml.) is added to liquid ammonia (70 ml.) containing ether (10 ml.) and aniline (2 ml.). Sodium metal (0.02 g.) is added with stirring, then quenched with ammonium chloride. Water is added and the mixture extracted with ether, the extract washed, dried, filtered and evaporated. The residue crystallized from ether-hexane to give *dl*-13-ethyl-3-cyclopentoxy-8α-gona-1,3,5(10)-trien-17β-ol.

Example V

To a solution of *dl*-3-acetoxy-13-ethyl-8α-gona-1,3,5(10)-trien-11,17β-diol (7.0 g.) in dimethyl formamide (80 ml.) and pyridine (20 ml.) is added methane sulfonyl chloride (10 ml.). The reaction mixture is heated under argon to 85° C. and kept at 85–90° C. for one hour, then cooled to room temperature. The reaction is poured into water, extracted into ether, the extract washed with water and brine, dried over anhydrous sodium sulfate, filtered and evaporated in vacuo. The residue in benzene is passed through a short column of Florex XXS, the benzene removed in vacuo and the resulting residue in 95 percent ethanol scratched and allowed to stand to deposit *dl*-3-acetoxy-13-ethyl-8α-gona-1,3,5(10),9(11)-tetraen-17β-ol, formate, The above prepared formate (2.0 g.) is added to a solution of sodium hydroxide (800 mg.) in methanol (100 ml.) and the resulting solution stirred and warmed briefly until solution is complete. The reaction mixture is stirred at room temperature for a half hour and then water is added dropwise to precipitate the crude product. The filtered solid in methylene chloride is treated with charcoal (Nuchar), filtered through super cel and the solvent replaced with isopropanol-heptane by boiling. The resulting product is *dl*-13-ethyl-8α-gona-1,3,5(10),9(11)-tetraen-3,17β-diol.

In the same manner, *dl*-3-butyryloxy-13-propyl-8α-gona-1,3,5(10)-trien-11,17β-diol is converted to *dl*-3-butyryloxy-13-propyl-8α-gona-1,3,5(10),9(11)-tetraen-17β-ol, formate which is then hydrolized to yield 13-propyl-8α-gona-1,3,5(10),9(11)-tetraen-3,17β-diol.

Example VI

Employing the procedure of the previous examples, the following 8α-gona-1,3,5(10)-trien-11,17β-diols are dehydrated to form their corresponding 8α-gona-1,3,5(10),9(11)-tetraen-17β-ol, formates which are hydrolyzed to their respective 8α-gona-1,3,5(10),9(11)-tetraen-17β-ols which are then hydrogenated to form their appropriate 8-gona-1,3,5(10)-trien-17β-ols.

| 8α-gona-1,3,5(10)-trien-11,17β-diols | 8α-gona-1,3,5(10),9(11)-tetraen-17β-ol, formate | 8α-gona-1,3,5(10),9(11)-tetraen-17β-ols | 8α-gona-1,3,5(10)-trien-17β-ols |
|---|---|---|---|
| *dl*-13-butyl-3-ethoxy-8α-gona-1,3,5(10)-trien-11,17β-diol. | *dl*-13-butyl-3-ethoxy-8α-gona-1,3,5(10),9(11)-tetraen-17β-ol, formate. | *dl*-13-butyl-3-ethoxy-8α-gona-1,3,5(10),9(11)-tetraen-17β-ol. | *dl*-13-butyl-3-ethoxy-8α-gona-1,3,5(10)-trien-17β-ol. |
| *dl*-3-butoxy-13-ethyl-8α-gona-1,3,5(10)-trien-11,17β-diol. | *dl*-3-butoxy-13-ethyl-8α-gona-1,3,5(10),9(11)-tetraen-17β-ol, formate. | *dl*-3-butoxy-13-ethyl-8α-gona-1,3,5(10),9(11)-tetraen-17β-ol. | *dl*-3-butoxy-13-ethyl-8α-gona-1,3,5(10)-trien-17β-ol. |
| *dl*-13-ethyl-3-ethoxy-8α-gona-1,3,5(10)-trien-11,17β-diol. | *dl*-13-ethyl-3-ethoxy-8α-gona-1,3,5(10),9(11)-tetraen-17β-ol, formate. | *dl*-13-ethyl-3-ethoxy-8α-gona-1,3,5(10),9(11)-tetraen-17β-ol. | *dl*-13-ethyl-3-ethoxy-8α-gona-1,3,5(10)-trien-17β-ol. |
| *dl*-13-ethyl-3-cyclohexoxy-8α-gona-1,3,5(10)-trien-11,17β-diol. | *dl*-13-ethyl-3-cyclohexoxy-8α-gona-1,3,5(10),9(11)-tetraen-17β-ol, formate. | *dl*-13-ethyl-3-cyclohexoxy-8α-gona-1,3,5(10),9(11)-tetraen-17β-ol. | *dl*-13-ethyl-3-cyclohexoxy-8α-gona-1,3,5(10)-trien-17β-ol. |
| *dl*-13-ethyl-3-tetrahydropyranyloxy-8α-gona-1,3,5(10)-trien-11,17β-diol. | *dl*-13-ethyl-3-tetrahydropyranyloxy-8α-gona-1,3,5(10),9(11)-tetraen-17β-ol, formate. | *dl*-13-ethyl-3-tetrahydropyranyloxy-8α-gona-1,3,5(10),9(11)-tetraen-17β-ol. | *dl*-13-ethyl-3-tetrahydropyranyloxy-8α-gona-1,3,5(10)-trien-17β-ol. |

Example VII

*dl*-13-methyl-3-methoxy - 8α - gona - 1,3,5(10),9(11)-tetraen-17β-ol (420 mg.) in ethanol (100 ml.) is added to a pre-hydrogenated mixture of 5 percent palladium on carbon and ethanol and the mixture treated until uptake of the hydrogen gas is complete. The filtered (super cel) mixture is evaporated in vacuo and the residue treated with charcoal (Nuchar) in methylene chloride. The filtered (super cel) solution is evaporated in vacuo and the residue triturated with methanol to give 70 mg. of *dl*-13-methyl-3-methoxy - 8α - gona 1,3,5(10)-trien-17β-ol, M.P. 96–99° C.

By the above described catalytic hydrogenation, the 8αgona-1,3,5(10),9(11)-tetraen-17β-ols described in the prior examples are converted to their corresponding 8α-gona-1,3,5(10)-trien-17β-ols.

What is claimed is:

1. A compound selected from the group consisting of those having the formula:

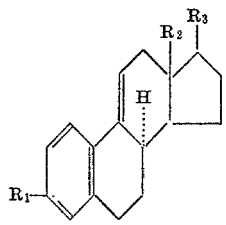

wherein $R_1$ is selected from the group consisting of hydroxy, tetrahydropyranyloxy, lower alkoxy, cyclo(lower)alkoxy and lower alkanoyloxy; $R_2$ is lower alkyl and $R_3$ is selected from the group consisting of hydroxy and formyloxy with the proviso that when $R_3$ is hydroxy $R_1$ is other than lower alkanoyloxy.

2. A compound as described in claim 1 which is: *dl*-13-methyl-3-methoxy - 8α - gona - 1,3,5(10),9(11)-tetraen-17β-ol, formate
3. A compound as described in claim 1 which is: *dl*-13-methyl-3-methoxy - 8α - gona - 1,3,5(10),9(11)-tetraen-17β-ol, formate.
4. A compound as described in claim 1 which is: *dl*-13-ethyl - 3 - methoxy - 8α - gona - 1,3,5(10),9(11)-tetraen-17β-ol, formate.
5. A compound as described in claim 1 which is: *dl*-13-ethyl-3-methoxy - 8α - gona - 1,3,5(10),9(11)-tetraen-17β-ol.
6. A compound as described in claim 1 which is: *dl*-13-ethyl-3-cyclopentoxy - 8α - gona - 1,3,5(10),9(11)-tetraen-17β-ol, formate.
7. A compound as described in claim 1 which is: *dl*-13-ethyl-3-cyclopentoxy - 8α - gona - 1,3,5(10),9(11)-tetraen-17β-ol
8. A compound as described in claim 1 which is: *dl*-3-acetoxy-13-ethyl - 8α - gona - 1,3,5(10),9(11)-tetraen-17βol, formate.
9. A compound as described in claim 1 which is: *dl*-13-ethyl - 8α - gona - 1,3,5(10),9(11)-tetraen-3,17β-diol.
10. A compound as described in claim 1 which is: *dl*-13-ethyl-3-ethoxy - 8α - gona - 1,3,5(10),9(11)-tetraen-17β-ol.

References Cited

UNITED STATES PATENTS

| | | | |
|---|---|---|---|
| 3,391,170 | 7/1968 | Hughes et al. | 260—397.5 |
| 3,262,855 | 7/1966 | Bucourt | 167—74 |

ELBERT L. ROBERTS, Primary Examiner

U.S. Cl. X.R.

260—999, 239.55

PO-1050
(5/69)

UNITED STATES PATENT OFFICE
CERTIFICATE OF CORRECTION

Patent No. 3,496,200         Dated February 17, 1970

Inventor(s) Reinhardt P. Stein, George Buzby, Jr., Herchel Smith

It is certified that error appears in the above-identified patent and that said Letters Patent are hereby corrected as shown below:

In column 2, lines 5-10, formula

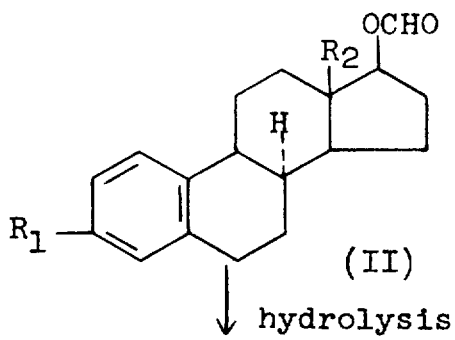

should read

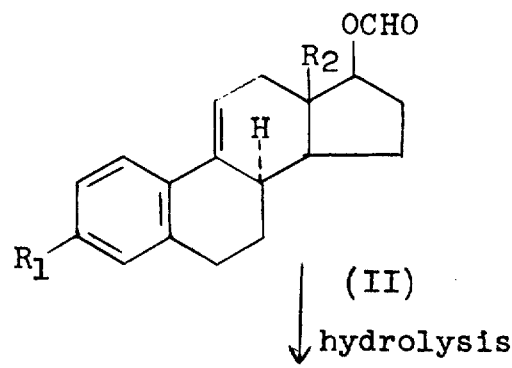

In column 2, lines 15-25, formula

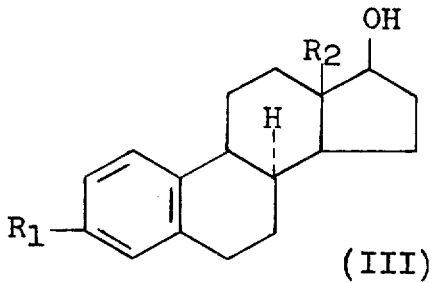

should read

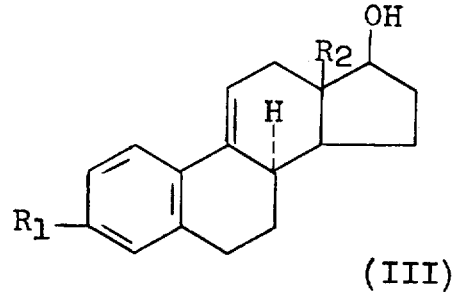

In column 3, lines 20-29, formula

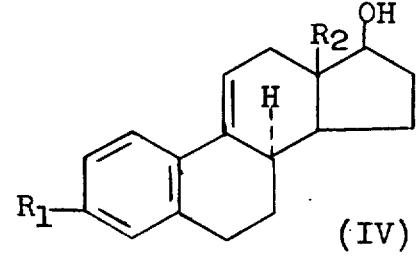

should read

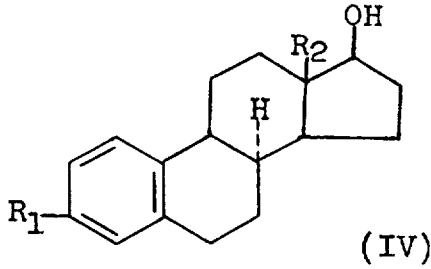

In column 8, line 5, delete --, formate--.

Signed and sealed this 18th day of August 1970.

(SEAL)
Attest:

EDWARD M. FLETCHER, JR.
Attesting Officer

WILLIAM E. SCHUYLER, JR.
Commissioner of Patents